United States Patent [19]

Hackler

[11] 4,352,680

[45] Oct. 5, 1982

[54] PROCESS AND/OR FACILITY FOR DRIVING OFF DISSOLVED, CORROSIVE GASEOUS CONSTITUENTS FROM WATERY SOLUTIONS

[75] Inventor: Erich Hackler, Essen-Kettwig, Fed. Rep. of Germany

[73] Assignee: Didier Engineering GmbH, Fed. Rep. of Germany

[21] Appl. No.: 58,761

[22] Filed: Jul. 19, 1979

[30] Foreign Application Priority Data

Jul. 22, 1978 [DE] Fed. Rep. of Germany ....... 2832359

[51] Int. Cl.$^3$ ............................................. B01D 19/00
[52] U.S. Cl. ........................................ 55/48; 55/70; 55/73; 203/100
[58] Field of Search ............... 55/36, 46, 48, 70, 73; 202/234; 203/100

[56] References Cited

U.S. PATENT DOCUMENTS

| | | | |
|---|---|---|---|
| 2,200,400 | 5/1940 | Sollner | 55/48 |
| 2,371,350 | 3/1945 | Nutting et al. | 203/100 X |
| 3,219,548 | 11/1965 | Margiloff | 203/100 X |
| 3,236,747 | 2/1966 | Margiloff | 203/100X |
| 3,335,071 | 8/1967 | Bollen et al. | 55/70 X |
| 3,441,483 | 4/1969 | Hart | 203/100 X |
| 3,891,496 | 6/1975 | Erwin | 203/100 X |
| 4,060,591 | 11/1977 | Garber et al. | 55/70 X |

Primary Examiner—Robert H. Spitzer
Attorney, Agent, or Firm—Wood, Herron & Evans

[57] ABSTRACT

A process for separating dissolved corrosive gases from aqueous solutions, e.g., scrubbing waters from a coking operation, is disclosed. The process involves directly contacting the solution with a hot liquid heat exchange medium, such as drops of heating oil, to drive off the dissolved gases. Residual ammonia in the solution is thereafter separated out by blowing steam into the treated solution.

18 Claims, 2 Drawing Figures

PROCESS AND/OR FACILITY FOR DRIVING OFF DISSOLVED, CORROSIVE GASEOUS CONSTITUENTS FROM WATERY SOLUTIONS

BACKGROUND OF THE INVENTION

This invention relates to a process for driving off dissolved corrosive gases from aqueous solutions. More particularly, this invention relates to a two-step process of first separating acid gases from solutions such as scrubbing waters from a coking plant and thereafter separating out the ammonia in the solution.

The watery condensates and scrubbing waters produced in coking plants and gas treatment facilitates contain hazardous and corrosive dissolved gases such as $NH_3$, $CO_2$, $HCN$, $H_2S$, etc. which normally are separated from solutions by heating and blowing in steam. This requires a considerable amount of heat and steam, especially when the $NH_3$ contained in the water is separated simultaneously with the above-mentioned components by steam introduction in column apparatuses. In addition, other apparatus such as heat exchangers and fractionating towers associated therewith are subject to considerable corrosion by the acid gases and ammonia.

SUMMARY OF THE INVENTION

It is among the principal objects of this invention to provide a process for separating out these corrosive gases in a simple and economical fashion.

This object and others are achieved by providing a process for separating dissolved corrosive gases wherein a heated liquid heat exchange medium immiscible in the aqueous solution is passed in direct contact with the solution to drive off the dissolved acid gases. In the presently preferred form of the invention, the liquid medium is light heating oil which is injected at the bottom of the solution and flows upwardly as drops of oil through the solution. Thereafter, the residual ammonia in the treated solution is removed by blowing steam into the treated solution. In accordance with the principles of this invention, the acid gases such as $CO_2$, $HCN$ and $H_2S$ are separated out at a lower temperature than the ammonia resulting in a considerable savings in steam. That is, the acid gases are driven off at a relatively low temperature, for example, somewhat above 338° K. and at atmospheric pressure after which the solution is heated to an elevated temperature of at least about 373° K. to drive off the ammonia.

The higher steam temperature in the ammonia separation phase of the process causes at the head of the ammonia separator about eight times as much steam as ammonia. This steam is preferably cooled to approximately 353° K. so that approximately one part of ammonia and one part of steam can be routed for burning. Since scrubbing waters contain predominantly acid gases less steam is burned than in the prior art steam separation process.

If an especially distinct separation between the acid gases and the ammonia in the scrubbing water is desired, the acid gases may be driven off at an elevated pressure in the range of about five bars and at an elevated temperature, for example, 423° K. In contrast to the prior art processes and facilities, corrosion is avoided in practice of this process as well. A more distinct separation from ammonia from the acid gases is desired for environmental reasons since the clean ammonia gases can be burned with a limited steam content in special combustion devices producing nitrogen oxide in a concentration below 100 ppm.

DETAILED DESCRIPTION OF THE INVENTION

Figure 1:
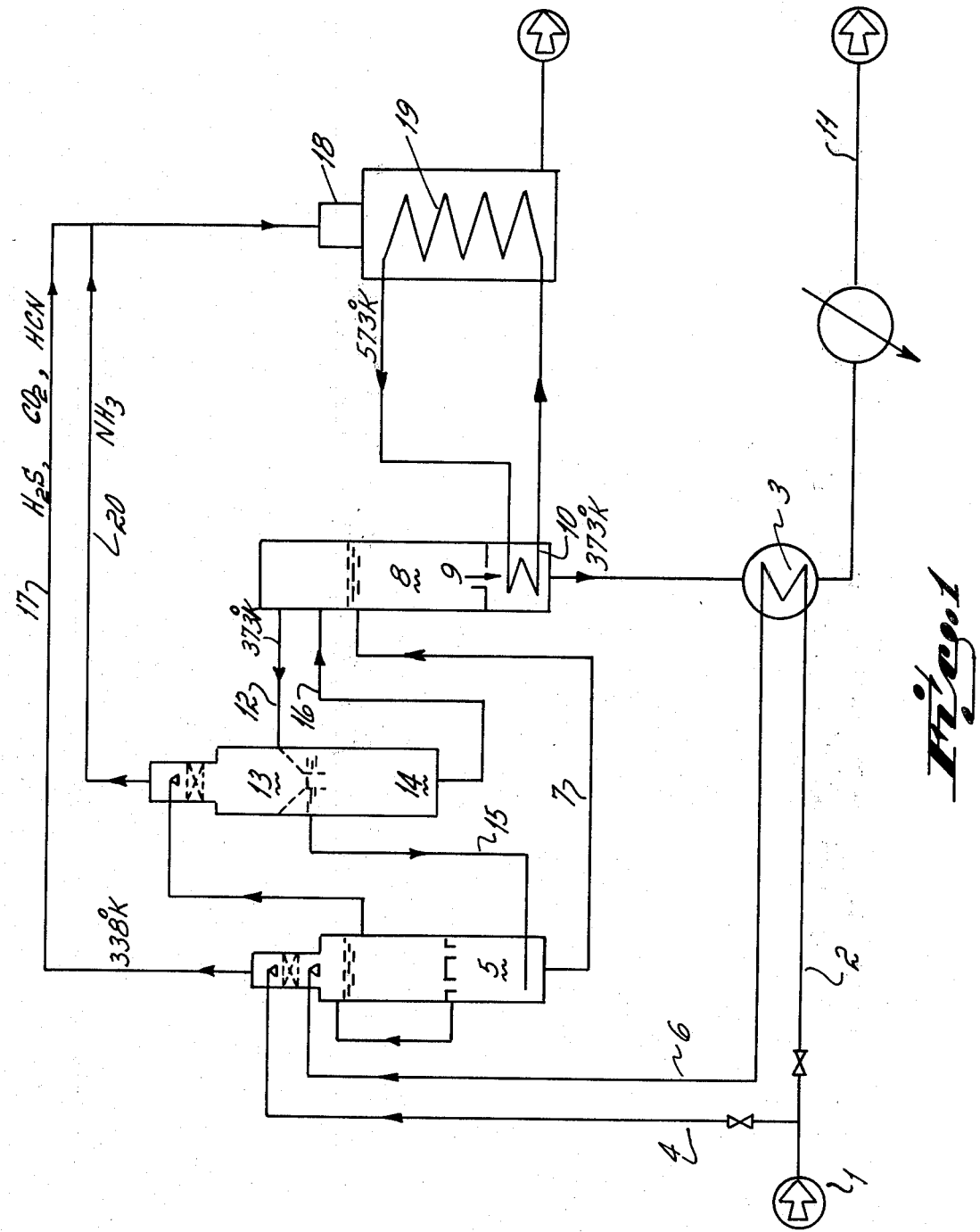
FIG. 1 is a schematic diagram of a process of this invention.

Referring to FIG. 1, ammonia containing scrubbing water resulting from treatment of coking gas enters the process with an ammonia content of, for example, 18 grams per liter and at a temperature of 303° K. via line 1. The flow is split into two partial flows. A partial flow of the scrubbing water proceeds through a line 2 into a heat exchanger 3 and is preheated by the hot treated scrubbing water from the ammonia separator 8 to a temperature of about 330° K., and then passed via a line 6 to a deacidifier 5. A second partial flow of untreated scrubbing water proceeds directly, without additional heat adsorption, via a line 4 to the deacidifier 5 and is sprayed as cooling water at the acid vapors issuing from the deacidifier 5, whereby these are cooled to about 338° K. and then leave the deacidifier 5 through a line 17 at the top.

The scrubbing water entering the deacidifier 5 through the two lines 4 and 6 is heated in the deacidifier 5 to a temperature of 338° to 345° K. by light heating oil which flows upward in the form of drops. The acid components of the scrubbing water are separated thereby, and the hot scrubbing water, essentially free of acid components, is passed to the $NH_3$ separator 8 via a line 7.

Steam is blown in the bottom area 9 of the separator 8 (not illustrated) whereby the scrubbing water is simultaneously heated to at least 373° K. with the aid of a thermal oil heated to 573° K. by an evaporator 10, thereby separating the so-called free $NH_3$ from the scrubbing water. Thus treated, the hot scrubbing water is withdrawn at the bottom of the $NH_3$ separator and passed to the above heat exchanger 3 where it is cooled against the partial flow of the as yet untreated scrubbing water passing through line 2 and is thereafter recirculated to scrubbing via a line 11. The $H_2O/NH_3$ vapors proceed from the $NH_3$ separator 8 via a line 12 at a temperature of about 373° K. to a vapor cooler 13. Cooled to 333° K., the heating oil coming from the deacidifier 5 is sprayed in the top area of the vapor cooler 13 for cooling of the $H_2O/NH_3$ vapors. The steam transforms into a condensate.

In a separating bottle 14 whose upper portion represents the vapor cooler 13, the oil is separated from the water. Heated by contact with the hot $H_2O/NH_3$ vapors, the oil returns through a line 15 to the deacidifier 5 and, as previously described, causing the heating of as yet untreated scrubbing water by direct phase contact. Containing large portions of $NH_3$, the steam condensate is withdrawn at the bottom of the separating bottle 14, below the oil layer, and returned to the $NH_3$ separator 8 via a line 16. The released $NH_3$ gases proceed through a line 20 to a burner 18 of a tubular furnace where also the acid gases from the line 17 coming from the deacidifier 5 are burned. The burner 18 transmits the combustion heat to a heat exchanger 19 which, in turn, through the circulation of the hot thermal oil, will give off the heat via the evaporator 10 in the $NH_3$ separator 8. The heat generated by burning the waste gases is thereby retrieved and utilized in the system.

Figure 2:
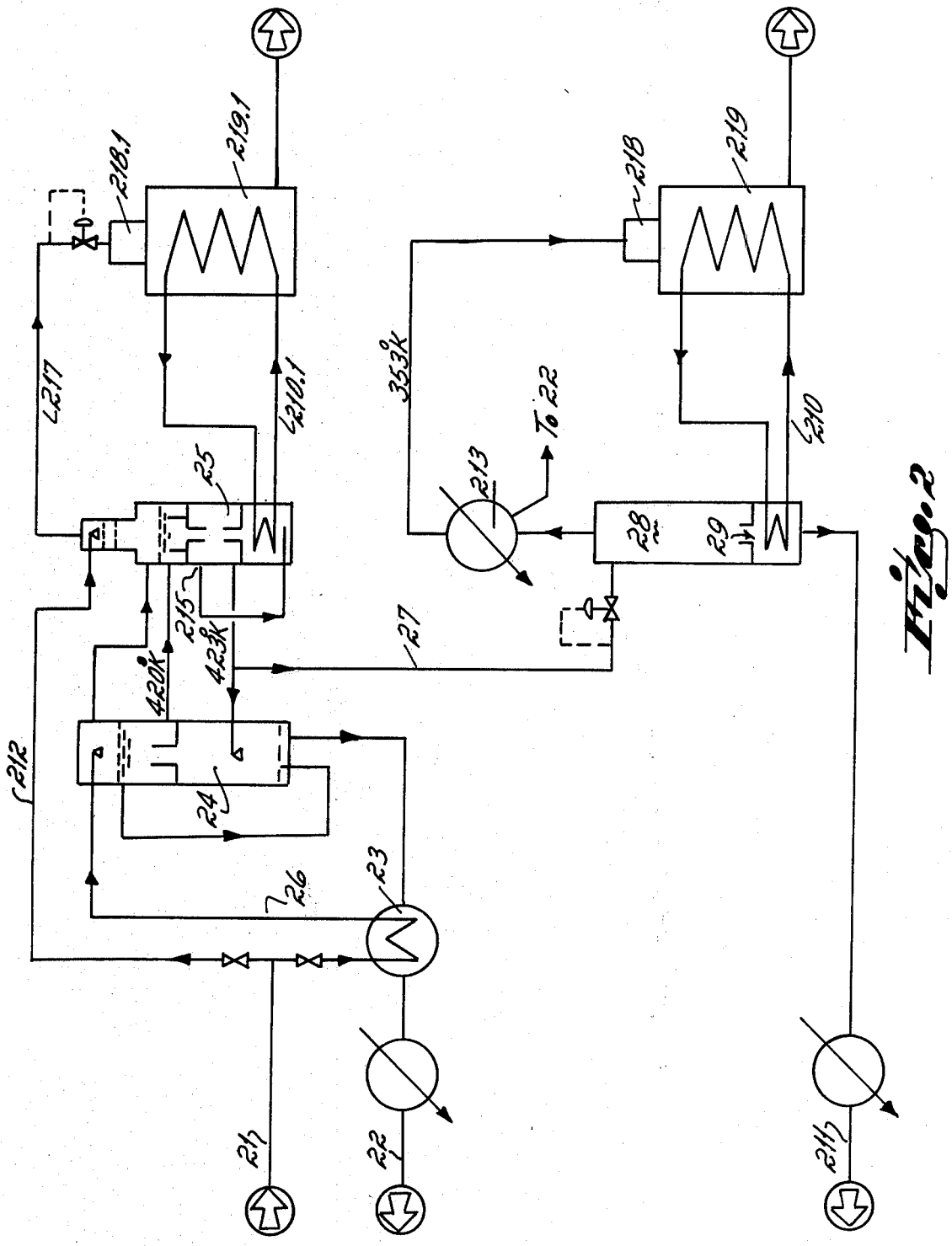
FIG. 2 is a schematic diagram of another embodiment of this invention.

In the second example according to FIG. 2, the NH$_3$ scrubbing water mentioned in the first example passes through a line 21 into a separator which for H$_2$S removal employs an NH$_3$ circulation scrubbing and a pressure deacidification. The NH$_3$ scrubbing water is split in two partial flows. The one partial flow is preheated in a conventional heat exchanger 23 to a temperature of 330° K., against the hot NH$_3$ water withdrawn from a heat exchanger 24 working in direct phase contact, and then passed via line 26 to the oil-water heat exchanger 24. The NH$_3$ water is heated here to 410° K. at a pressure of about 5 bars and then passed to a pressure deacidifier. Introduced directly into the latter via a line 212 is the second, not preheated partial flow of the as yet untreated NH$_3$ scrubbing water, as cooling medium. The scrubbing water is rid of the acid gas components in the pressure deacidifier 25 by heating to a temperature of 423° K.

Thereafter still containing NH$_3$, the water flows from the pressure deacidifier 25 partly back to the heat exchanger 24 where it is withdrawn at the bottom and cooled in the heat exchanger 23 against a partial flow of the as yet untreated scrubbing water flowing through the line 21, and is then recirculated to the H$_2$S scrubbers via a line 22. The other partial flow of the NH$_3$ water is passed from the pressure deacidifier 25 through a line 27 to an NH$_3$ separator 28 and freed there of the NH$_3$ components. The scrubbing water treated here returns after the (not illustrated) cooling through a line 211 to the NH$_3$ scrubbers, as scrubbing water. The NH$_3$ vapors issuing from the latter NH$_3$ separator 28 are passed to a burner 218 of a tubular furnace and burned there, after cooling in a vapor cooler 213. Containing considerable portions of NH$_3$, the condensate from the vapor cooler 213 is passed again to the line 22 of the H$_2$S scrubbing water.

The above burner 218 transmits the combustion heat to a heat exchanger 219 which by way of a thermal oil circulation connects with a vaporizer 210 in the bottom area of the NH$_3$ separator 28 and serves to generate steam which is blown through the bottom 29 into the separator 28. Now nonhazardous, the waste gases from the tubular furnace with the heat exchanger 219 are released into the open.

The acid gases from the pressure deacidifier 25 are passed via a line 217 and proceed in decompressed state to a burner 218.1 of a second tubular furnace. The reclaimed heat is utilized in an evaporator 210.1 in the bottom of the pressure deacidifier 25 by way of a heat exchanger 219.1 contained in the tubular furnace and coupled with the burner 218.1, as well as via a thermal oil circulation 215.

I claim:

1. A process for separating dissolved gaseous constituents from an aqueous solution containing acid gases and ammonia, said process comprising the steps of directly contacting said aqueous solution with drops of hot light heating oil immiscible in said solution to separate said acid gases from said solution to form a treated solution, introducing steam into said treated solution to separate out ammonia and to form an ammonia-water vapor, and cooling said vapor with the oil from the acid separation step to condense the water component of said vapor.

2. The process of claim 1 wherein the acid gases are separated from said aqueous solution containing acid gases and ammonia at atmospheric pressure and at a temperature of less than about 345° K., and wherein the treated solution is heated to a temperature of at least 373° K. by the introductin of steam therein to separate out the ammonia.

3. The process of claim 1 wherein said acid gases are separated from said solution at a pressure of about five bars and a temperature of about 423° K.

4. The process of claim 1 wherein at least a partial flow of said aqueous solution is preheated and wherein said drops of hot light heating oil flow in an upward direction through said solution.

5. The process of claim 4 wherein at least a partial flow of the aqueous solution is sprayed to cool the gases separated from said aqueous solution.

6. The process of claim 5 wherein said gases are cooled to about 338° K.

7. The process of claim 1 wherein the aqueous solution after separation of the ammonia is cooled by passing at least a partial flow of aqueous solution to be treated in heat exchange relationship therewith.

8. A process for separating dissolved gaseous constituents from an aqueous solution containing acid gases and ammonia, said process comprising the steps of introducing said aqueous solution into a deacidifier, introducing drops of hot light heating oil into the bottom of said deacidifier, said oil flowing in an upward direction through said aqueous solution to separate said acid gases from said solution, withdrawing the treated solution from said deacidifier, introducing said treated solution into an ammonia separator, introducing steam into said treated solution in said ammonia separator to separate out the residual ammonia, introducing the H$_2$O/NH$_3$ vapor issuing out of the ammonia separator into a vapor cooler, cooling said vapor by contacting it with cooled heating oil from said deacidifier in a top section of said vapor cooler, accumulating the condensate in a bottom section of said vapor cooler, said oil forming a layer on the top of said condensate, withdrawing said oil from said cooler, and withdrawing said condensate from said cooler.

9. The process of claim 8 wherein the condensate withdrawn from said vapor cooler is introduced into said ammonia separator at a point above the introduction of the treated solution withdrawn from said deacidifier.

10. The process of claim 8 wherein said aqueous solution is preheated in an oil-water heat exchanger at a pressure of about five bars and wherein the acid gases are separated in a pressure deacidifier.

11. The process of claim 10 wherein at least a portion of the treated solution in the oil-water heat exchanger is withdrawn and passed in heat exchange relationship with at least a partial flow of the aqueous solution to be treated to cool said withdrawn solution.

12. The process of claim 10 including the further steps of withdrawing a hot ammonia-containing aqueous solution from said pressure deacidifier, introducing a part of said withdrawn solution into said oil-water heat exchanger and introducing a part of said withdrawn solution into an ammonia separator.

13. The process of claim 12 wherein the acid gases separated from said solution in said pressure deacidifier and the ammonia separated from said treated solution in said ammonia separator are burned in separate burners.

14. The process of claim 13 including the step of reclaiming the heat from said burners and respectively heating said ammonia separator and said pressure deacidifier with said reclaimed heat.

15. The process of claim 8 wherein the acid gases are separated from said aqueous solution containing acid gases and ammonia at atmospheric pressure and at a temperature of less than about 345° K., and wherein the treated solution is heated to a temperature of at least about 373° K. to separate out the ammonia.

16. The process of claim 8 wherein said acid gases are separated from said aqueous solution containing acid gases and ammonia at a pressure of about five bars and a temperature of about 423° K.

17. The process of claim 1 and 8 wherein the gases separated from said aqueous solution are burned.

18. The process of claim 17 wherein the heat generated by burning said gases is used to heat the solution in said ammonia separator.

* * * * *

UNITED STATES PATENT AND TRADEMARK OFFICE
CERTIFICATE OF CORRECTION

PATENT NO. : 4,352,680
DATED : October 5, 1982
INVENTOR(S) : Erich Hackler

It is certified that error appears in the above-identified patent and that said Letters Patent are hereby corrected as shown below:

Column 1, line 14, "facilitates" should be --facilities--.

Column 2, line 23, "adsorption" should be --absorption--.

Column 4, line 4, "introductin" should be --introduction--.

The title of the patent should correctly read as follows: --Process for Separating Dissolved Corrosive Gases from Aqueous Solutions--.

Signed and Sealed this

Fifteenth Day of February 1983

|SEAL|

Attest:

GERALD J. MOSSINGHOFF

Attesting Officer      Commissioner of Patents and Trademarks